Feb. 7, 1928.  
R. J. MEYER  
FRICTION DRUM FOR AUTOS  
Original Filed Oct. 26, 1925

1,658,410

R. J. Meyer  
Inventor  
By C. A. Snow & Co.  
Attorneys.

Patented Feb. 7, 1928.

1,658,410

UNITED STATES PATENT OFFICE.

RALPH J. MEYER, OF DENVER, COLORADO, ASSIGNOR, BY DIRECT AND MESNE ASSIGNMENTS, TO NATIONAL BRAKE COMPANY, A CORPORATION OF COLORADO.

FRICTION DRUM FOR AUTOS.

Application filed October 26, 1925, Serial No. 64,890. Renewed December 27, 1927.

This invention relates to motor vehicle brakes and aims to provide a novel form of brake constructed in such a way as to eliminate the use of brake liners, commonly used in brake constructions.

Another object of the invention is to provide a brake that may be readily and easily repaired and one which may operate efficiently as a brake.

With the foregoing and other objects in view which will appear as the description proceeds, the invention resides in the combination and arrangement of parts and in the details of construction hereinafter described and claimed, is being understood that changes in the precise embodiment of the invention herein disclosed, may be made within the scope of what is claimed, without departing from the spirit of the invention.

Referring to the drawing.

Figure 1:
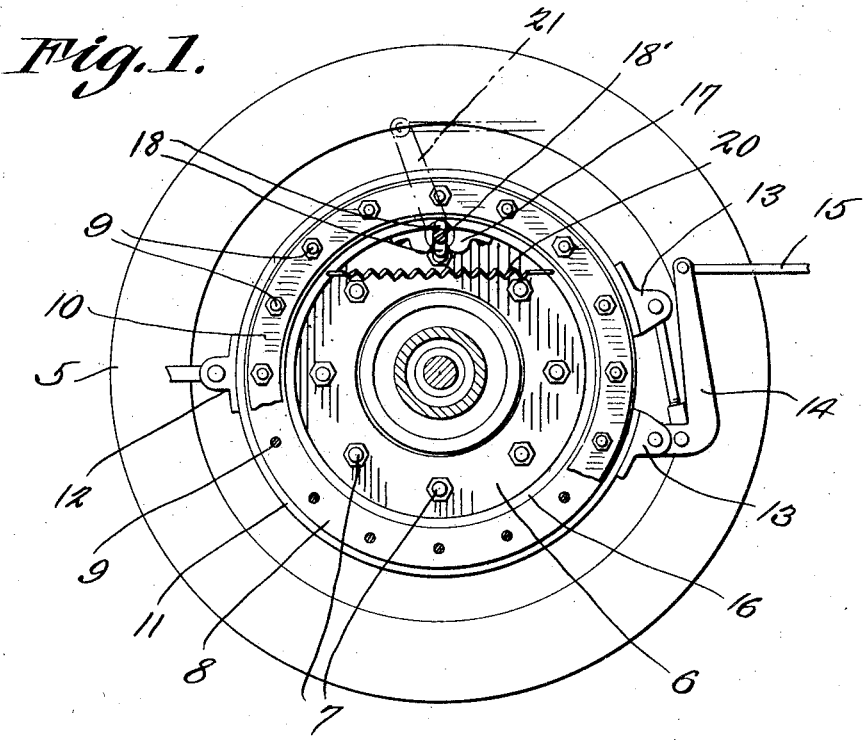
Figure 1 is an elevational view illustrating a brake constructed in accordance with the invention.
Figure 2:
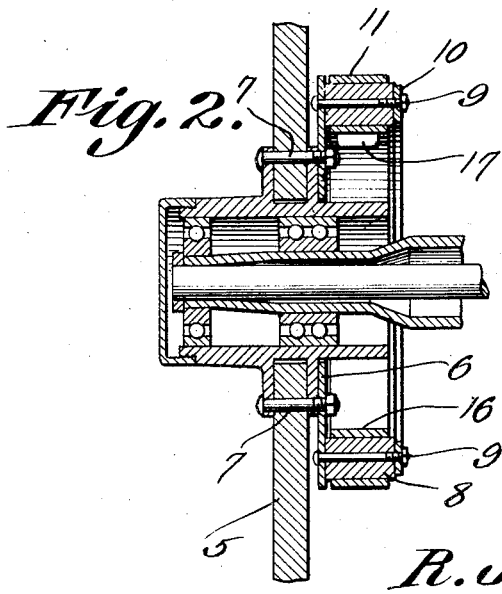
Figure 2 is a vertical sectional view through the device.

Referring to the drawing in detail, the reference character 5 indicates a motor vehicle wheel which is supplied with a brake constructed in accordance with the invention.

The brake includes a disk 6 which is bolted to the wheel as by means of the bolts 7 that are employed for securing the body portion of the wheel to its hub.

The reference character 8 indicates the brake drum formed preferably of wood or fiber. However it is to be understood that suitable fibrous materials may be employed in the construction of the brake drum without departing from the spirit of the invention.

The drum is held in position by means of the bolts 9, there being provided a securing ring 10 for securing the drum in such a way as to equally distribute the strain directed to the drum throughout the entire surface thereof. Cooperating with the drum 8 is an outer brake band 11 which is supported at 12, the forward ends thereof being provided with ears 13 to which the operating lever 14 is secured, the operating lever being operated by means of the rod 15 that may have connection with the usual brake pedal.

Cooperating within the brake drum is the brake band 16 or emergency brake, which is provided with enlargements 17 at its ends, which enlargements are formed with cut out portions to accommodate the enlargements 18 formed on the rod 18' so that as the rod 18' is rotated in one direction, the sections of the band 16 will be spread apart to frictionally engage the drum 8, whereas when the rod 18' is moved in the opposite direction, the band 16 will be permitted to contact or move away from the drum 8.

In order that the band will move away from the drum 8, a coiled spring 20 is provided which spring has its ends mounted in suitable openings formed in the band 16.

An operating lever indicated at 21 has connection with the rod 18' and may be operated by the usual emergency brake lever now in use.

From the foregoing it will be seen that due to this construction, the brake bands may be forced into engagement with the drum 8 to set up a binding action therebetween, to retard the movement of the wheel supporting the brake.

It will further be noted that due to the construction as shown and described, the drum may be readily and easily removed and replaced when the same becomes worn or otherwise rendered inoperative.

I claim:—

1. In a device of the character described, a brake drum supporting disk, a brake drum embodying a circular member formed of fibrous material, bolts extending through the drum for connecting the drum to the disk, and brake bands cooperating with the opposite sides of the drum to brake the wheel to which the drum is secured.

2. In a device of the character described, a brake drum support including a disk, a brake drum comprising a circular wooden member, brake bands cooperating with the brake drum, and said brake bands adapted to engage the inner and outer surfaces of the drum.

In testimony that I claim the foregoing as my own, I have hereto affixed my signature.

RALPH J. MEYER.